United States Patent
Mlinar et al.

(10) Patent No.: US 10,708,524 B2
(45) Date of Patent: Jul. 7, 2020

(54) METHODS AND APPARATUS FOR HIGH DYNAMIC RANGE IMAGING

(71) Applicant: SEMICONDUCTOR COMPONENTS INDUSTRIES, LLC, Phoenix, AZ (US)

(72) Inventors: Marko Mlinar, Horjul (SI); Simon Srot, Ljubljana (SI)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 0 days.

(21) Appl. No.: 16/042,167

(22) Filed: Jul. 23, 2018

(65) Prior Publication Data

US 2019/0075263 A1    Mar. 7, 2019

Related U.S. Application Data

(60) Provisional application No. 62/553,461, filed on Sep. 1, 2017.

(51) Int. Cl.
| | |
|---|---|
| *H04N 5/355* | (2011.01) |
| *H04N 5/235* | (2006.01) |
| *H04N 1/64* | (2006.01) |
| *H04N 9/07* | (2006.01) |
| *B60R 21/015* | (2006.01) |

(52) U.S. Cl.
CPC .......... *H04N 5/35581* (2013.01); *H04N 1/64* (2013.01); *H04N 5/2355* (2013.01); *H04N 5/2356* (2013.01); *H04N 9/07* (2013.01); *B60R 21/01538* (2014.10)

(58) Field of Classification Search
CPC ............ H04N 5/2355; H04N 5/2356; H04N 5/35572; H04N 5/35581; H04N 1/64
See application file for complete search history.

(56) References Cited

U.S. PATENT DOCUMENTS

| | | | |
|---|---|---|---|
| 7,362,365 B1* | 4/2008 | Reyneri | H04N 3/155 348/297 |
| 9,613,409 B1* | 4/2017 | Tsai | G06T 5/009 |
| 2002/0140842 A1 | 10/2002 | Olding | |

(Continued)

FOREIGN PATENT DOCUMENTS

EP    2928175 A1    10/2015

*Primary Examiner* — Daniel M Pasiewicz
(74) *Attorney, Agent, or Firm* — The Noblitt Group, PLLC; Hettie L. Haines

(57) ABSTRACT

Various embodiments of the present technology comprise a method and apparatus for high dynamic range imaging. According to various embodiments, the method and apparatus for high dynamic range imaging is configured to select the "best" signal for each pixel location to construct an HDR output. In one embodiment, the "best" signal is select among various pixel signals and the pixel signal selected as the "best" signal is based on the value of the pixel signals and identification of non-saturated. If only one pixel value for a particular pixel location is non-saturated, then the "best" signal is the non-saturated signal. If more than one pixel value is non-saturated, then the "best" signal is the pixel signal with the greatest value. If two more pixel values are non-saturated and both have equally great values, then the "best" signal is the pixel signal with the shortest integration time.

20 Claims, 11 Drawing Sheets

(56) References Cited

U.S. PATENT DOCUMENTS

| | | | |
|---|---|---|---|
| 2004/0041927 A1* | 3/2004 | Cho | H04N 3/155 |
| | | | 348/254 |
| 2008/0198251 A1 | 8/2008 | Xu | |
| 2010/0259626 A1* | 10/2010 | Savidge | H04N 5/235 |
| | | | 348/208.4 |
| 2012/0081577 A1 | 4/2012 | Cote | |
| 2015/0055000 A1 | 2/2015 | Bock | |
| 2015/0221095 A1* | 8/2015 | Tanaka | H04N 5/2355 |
| | | | 348/169 |
| 2015/0312476 A1 | 10/2015 | Wakabayashi | |
| 2016/0105596 A1* | 4/2016 | Hatakeyama | H04N 5/2355 |
| | | | 348/239 |
| 2017/0230560 A1* | 8/2017 | Nemoto | H04N 5/2352 |
| 2017/0302861 A1* | 10/2017 | Shibata | H04N 5/355 |

* cited by examiner

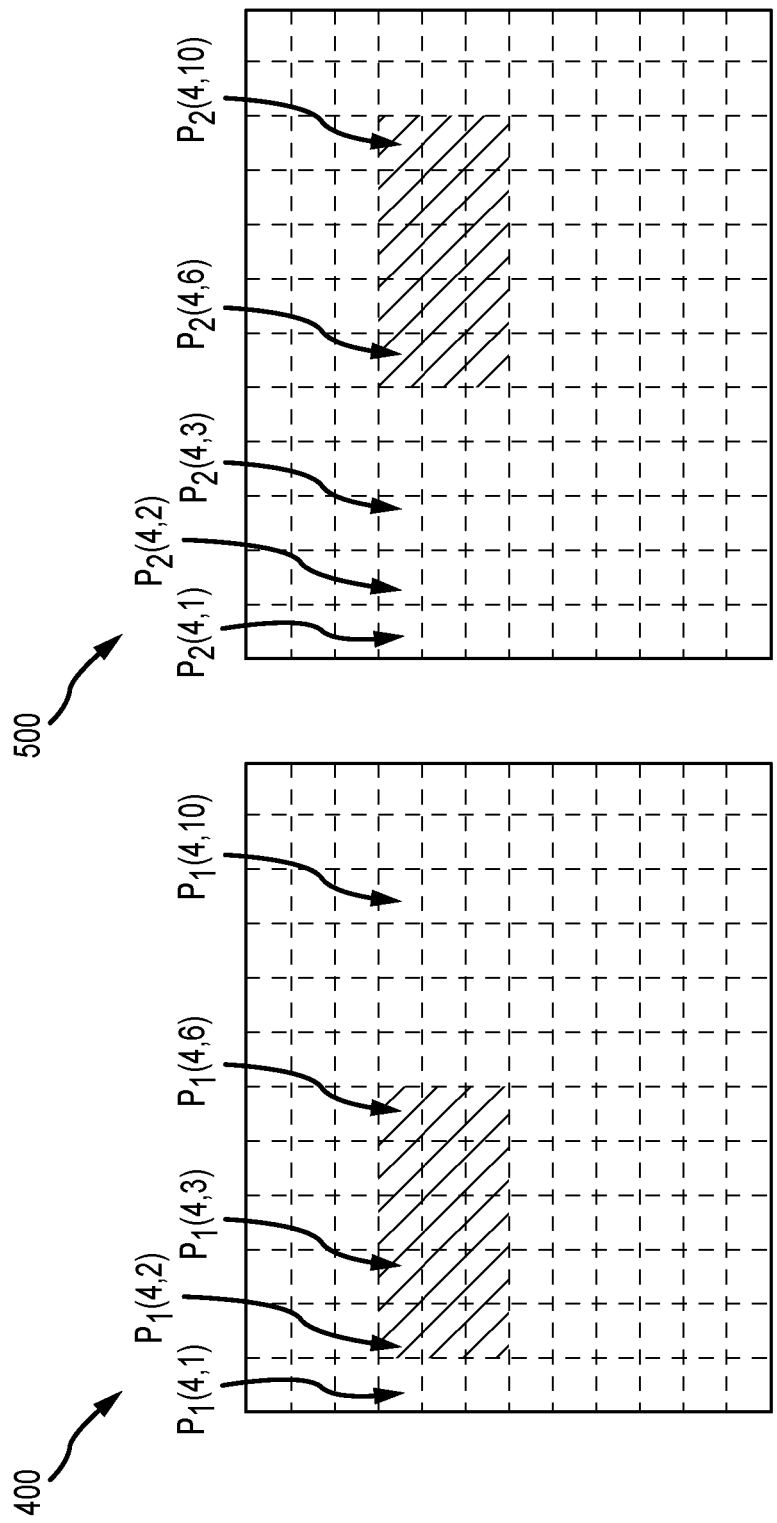

```
if  (P3 >= p3_saturated_value)   P3 = 0;
if  (P2 >= p2_saturated_value)   P2 = 0;
if  (P1 >= p1_saturated_value)   P1 = 0;

if  ((P4 >= P3) && (P4 >= P2) && (P4 >= P1)) {
      out = P4; out_sel = 3;
} else if   ((P3 >= P2) && (P3 >= P1)) {
      out = P3; out_sel = 2;
} else if   (P2 >= P1) {
      out = P2; out_sel = 1;
} else {
      out = P1; out_sel = 0;
}
```

FIG.9

```
if (out_sel == 0) {
      out_hdr = out;

} else if (out_sel == 1) {
      out_hdr = out*T1/T2;

} else if (out_sel == 2)
      out_hdr = out*T1/T3;

} else  (out_sel == 3) {
      out_hdr = out*T1/T4;

```
if (out_sel == 0) {
        out_hdr = out;
} else if (out_sel == 1) {
        out_hdr = max(out, p1_saturated_value*T2/T1) *T1/T2;
} else if (out_sel == 2)
        out_hdr = max(out, p2_saturated_value*T3/T2) *T1/T3;
} else  (out_sel == 3) {
        out_hdr = max(out, p3_saturated_value*T4/T3) *T1/T4;
}
```

FIG.11

```
i = preferred_exposure_configuration_register
while (P[i] < threshold_lo && i > 1)
        i = i - 1 while (P[i] >= threshold_hi && i < number_of_integration_times)
        i = i + 1 out = P[i];
out_sel = i - 1;
```

FIG.12

METHODS AND APPARATUS FOR HIGH DYNAMIC RANGE IMAGING

CROSS-REFERENCE TO RELATED APPLICATION

This application claims the benefit of U.S. Provisional Patent Application Ser. No. 62/553,461, filed on Sep. 1, 2017, and incorporates the disclosure of the application in its entirety by reference.

BACKGROUND OF THE TECHNOLOGY

In many applications, such as automotive and others, require image sensors with high dynamic range (HDR). High dynamic range may be achieved with low dynamic range sensors. Low dynamic range sensors may use a multi-integration-time approach to achieve a required dynamic range. In the case of low dynamic range sensors, multiple integration time signals are linearized (normalized to longest integration time signal) and combined into a single HDR signal on the sensor in order present such sensor as true HDR sensor. Combining signals, however, may create motion and flicker artifacts, which may alter the actual color of a moving or flickering object if one color channel output signal is composed from one combination of integration time signals while the other output color channel signal is composed of another combination. Once such HDR output is constructed, it is impossible to decode which integration time signal combination was used for constructing a given pixel HDR value. In the absence of such information, applications, such as machine vision and/or advanced driver assist systems (ADAS), are unable to rely on color of a given region of the image frame, and may result in unreliable operation of the application.

SUMMARY OF THE INVENTION

Various embodiments of the present technology comprise a method and apparatus for high dynamic range imaging. According to various embodiments, the method and apparatus for high dynamic range imaging is configured to select the "best" signal for each pixel location to construct an HDR output. In one embodiment, the "best" signal is select among various pixel signals and the pixel signal selected as the "best" signal is based on the value of the pixel signals and identification of non-saturated. If only one pixel value for a particular pixel location is non-saturated, then the "best" signal is the non-saturated signal. If more than one pixel value is non-saturated, then the "best" signal is the pixel signal with the greatest value. If two more pixel values are non-saturated and both have equally great values, then the "best" signal is the pixel signal with the shortest integration time.

BRIEF DESCRIPTION OF THE DRAWING FIGURES

A more complete understanding of the present technology may be derived by referring to the detailed description when considered in connection with the following illustrative figures. In the following figures, like reference numbers refer to similar elements and steps throughout the figures.

FIG. 1 representatively illustrates a camera system in accordance with an first embodiment of the present technology;

Figure 6:
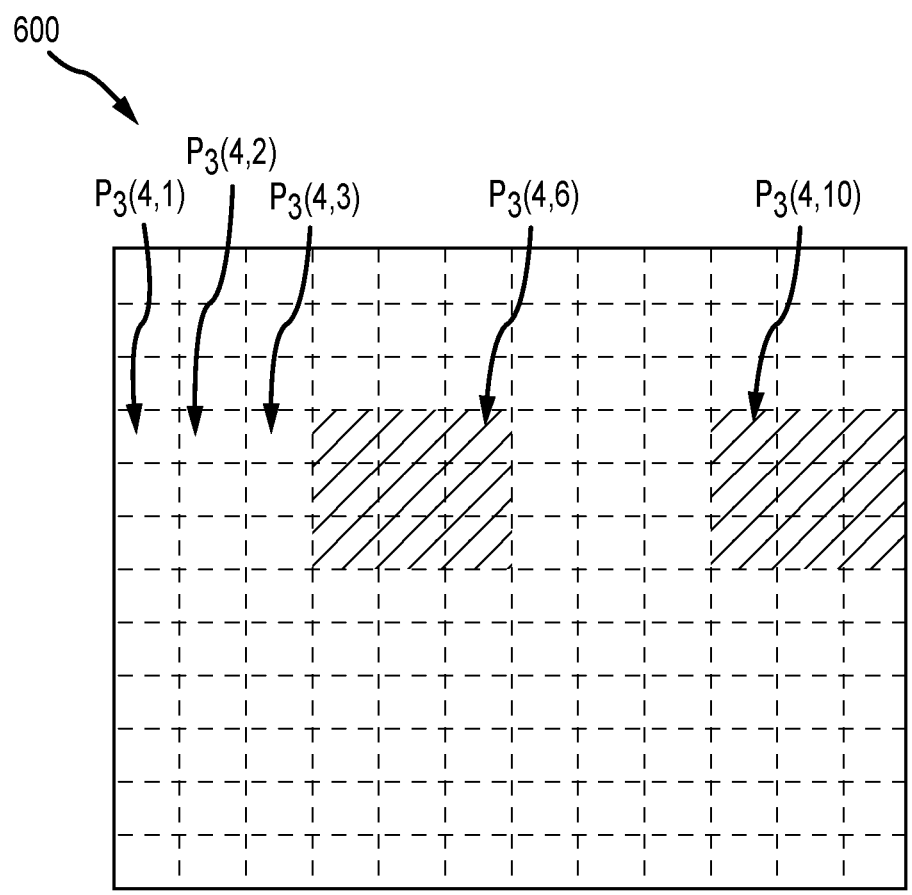
Figure 7:
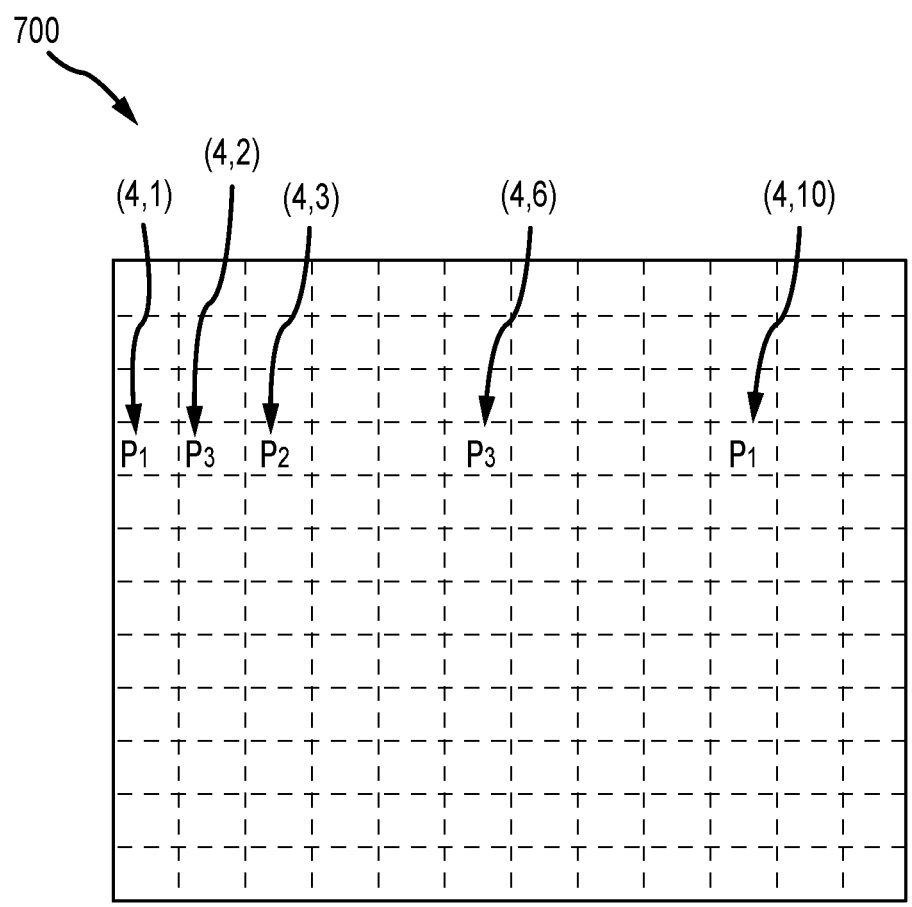
Figure 8:
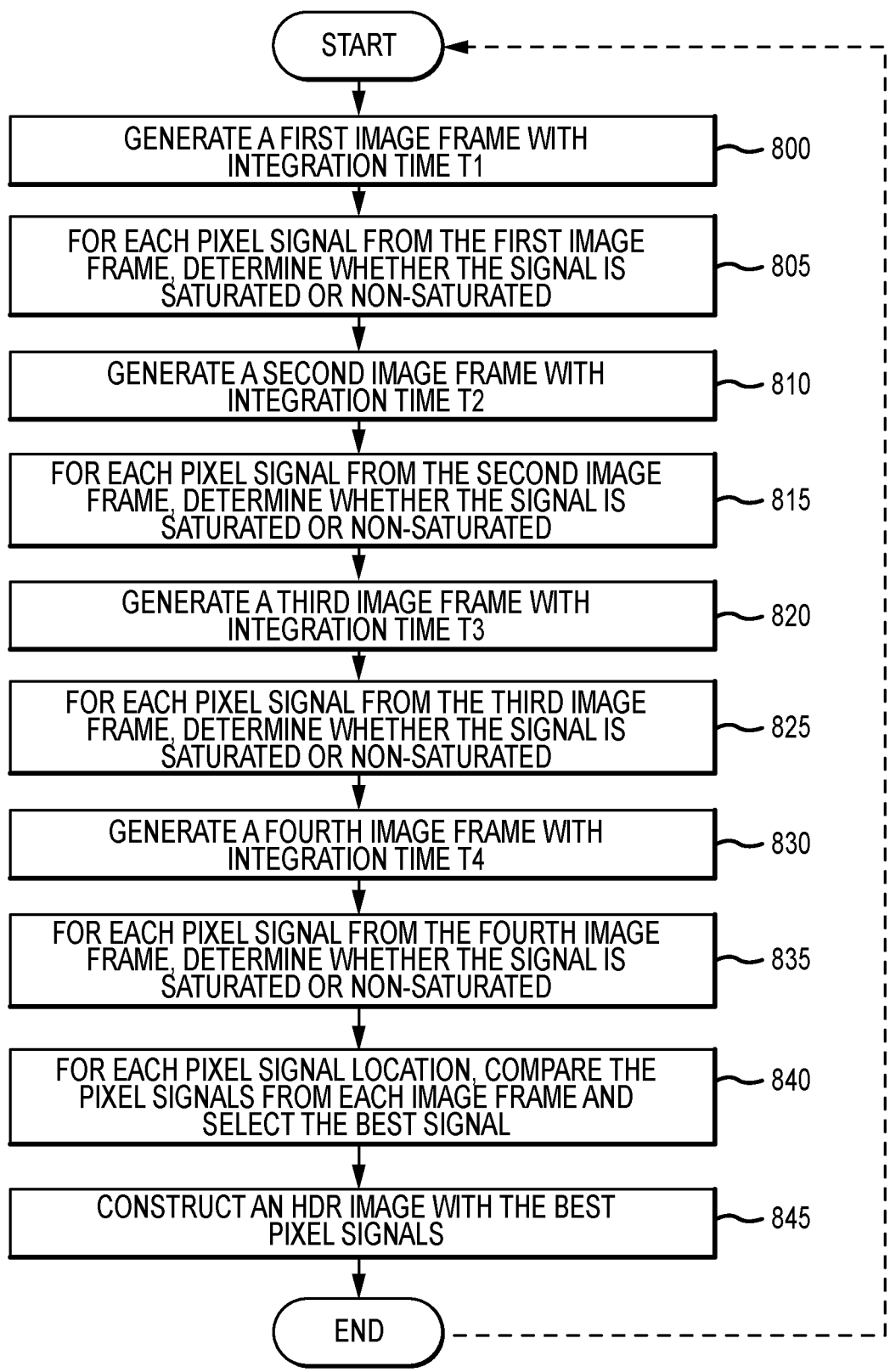

FIG. 4 representatively illustrates a first image frame in accordance with an exemplary embodiment of the present technology;

FIG. 5 representatively illustrates a second image frame in accordance with an exemplary embodiment of the present technology;

FIG. 6 representatively illustrates a third image frame in accordance with an exemplary embodiment of the present technology;

FIG. 7 representatively illustrates a high dynamic range (HDR) output in accordance with an exemplary embodiment of the present technology;

FIG. 8 is a flowchart for constructing the HDR output in accordance with an exemplary embodiment of the present technology;

FIG. 9 is a pseudo code for selecting a best pixel signal in accordance with an exemplary embodiment of the present technology;

FIG. 10 is a pseudo code for applying a linearization gain in accordance with an exemplary embodiment of the present technology;

FIG. 11 is a pseudo code for applying linearization gains in accordance with an exemplary embodiment; and FIG. 12 is a pseudo code for selecting the best pixel signal in accordance with an alternative embodiment of the present technology.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various types of image sensors, image signal processors, logic units, readout circuitry, signal converters, and the like, which may carry out a variety of functions. In addition, the present technology may be practiced in conjunction with any number of imaging applications. Further, the present technology may employ any number of conventional techniques for capturing image data, transmitting signals, sampling signals, and the like.

The methods and apparatus for high dynamic range imaging, according to various aspects of the present technology, may be used in conjunction with any suitable system, such as a camera system, video system, machine vision, vehicle navigation, surveillance system, motion detection system, advanced driver assist system (ADAS), and the like. Various representative implementations of the present technology may be applied, for example, to any image sensor, imaging device, pixel array, and the like.

Methods and apparatus for high dynamic range imaging according to various aspects of the present technology may operate in conjunction with any suitable system. According to various applications, the system may comprise an imaging device 145 to capture image data and process the image data.

Figure 1:
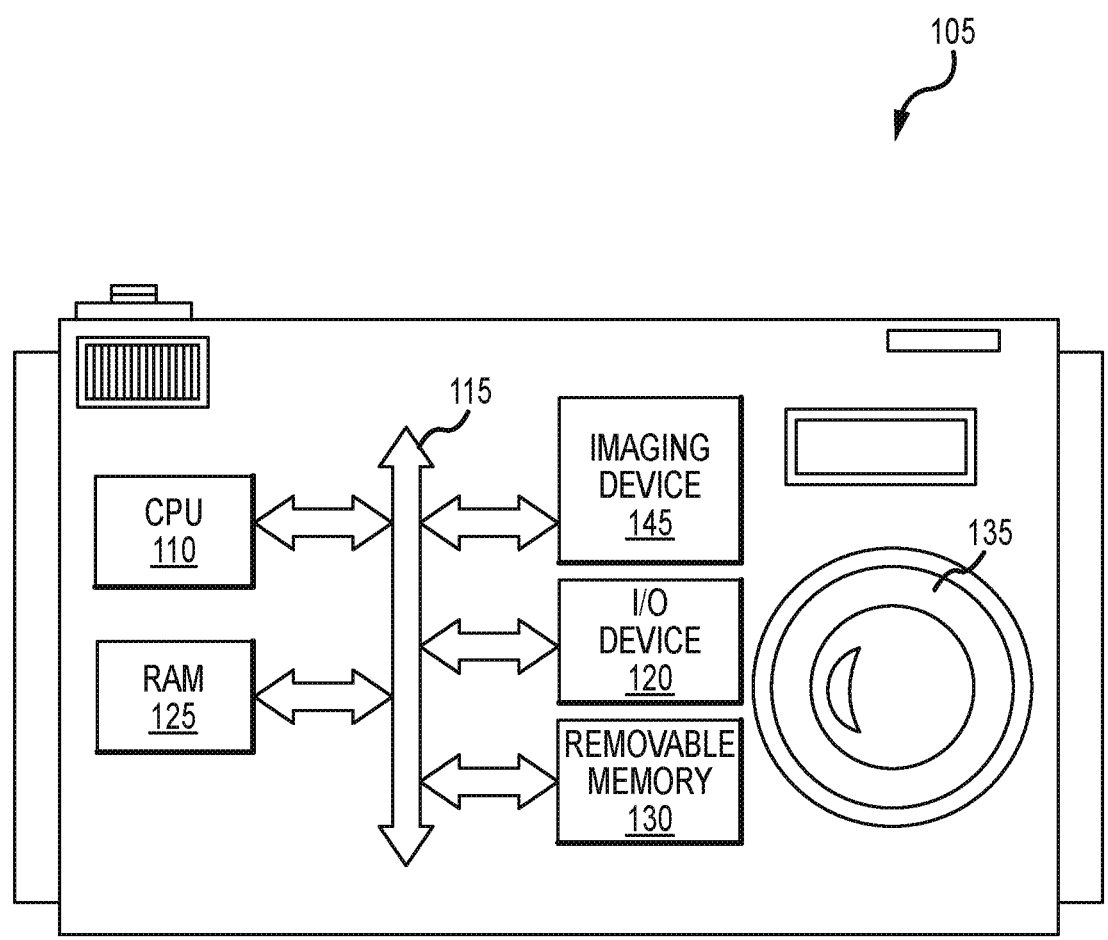

Referring to FIG. 1, in a first application the methods and apparatus for high dynamic range imaging may be incorporated in an electronic device system, such a digital camera 105. According to the present application, the digital camera

105 may comprise a central processing unit (CPU) 110 that communicates with various devices over a bus 115. Some of the devices connected to the bus 115 may provide communication into and out of the system, for example an input/output (I/O) device 120 and the imaging device 145. Other devices connected to the bus 115 provide memory, for example, a random access memory (RAM) 125, hard drive, and one or more peripheral memory devices 130, such as a removable memory device. While the bus 115 is illustrated as a single bus, any number of busses may be used to provide communication paths to interconnect the devices.

In various embodiments, the digital camera 105 may further comprise a lens 135 configured to focus an image on a sensing surface of the imaging device 145. For example, the lens 35 may include a fixed and/or adjustable lens adjacent to the sensing surface of the imaging device 145.

Figure 3:
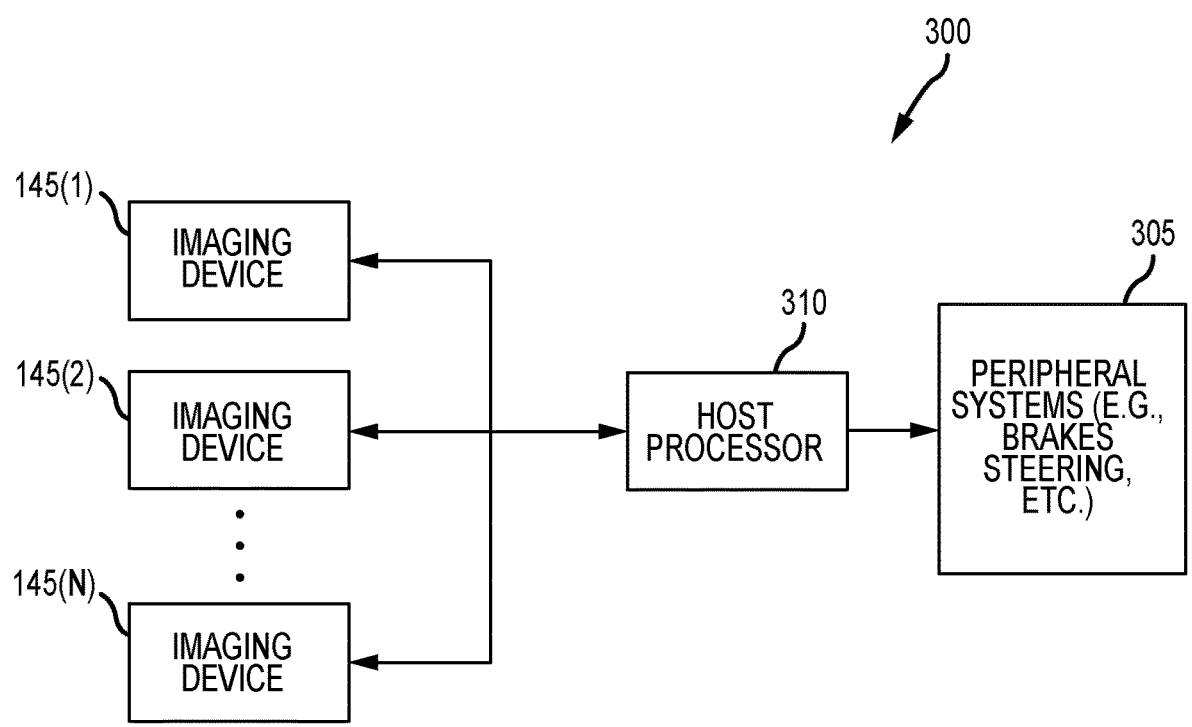
FIG. 3 is a block diagram of a vehicle system in accordance with a second embodiment of the present technology.

Referring to FIG. 3, in a second application the methods and apparatus for high dynamic range imaging may be incorporated in a vehicle system, such as an ADAS 300. In the present application, the system 300 may comprise a plurality of imaging devices 145(1:N), wherein each imaging device 145 is connected to a host processor 310. A host processor 310 may receive image data from the imaging device 145 and make decisions based on the image data. In the present embodiment, the host processor 310 may control various peripheral systems 305, such as a braking system, a steering system, and the like. For example, the host processor 310 may transmit control signals, based on the image data, to the various peripheral systems 305.

Figure 2:
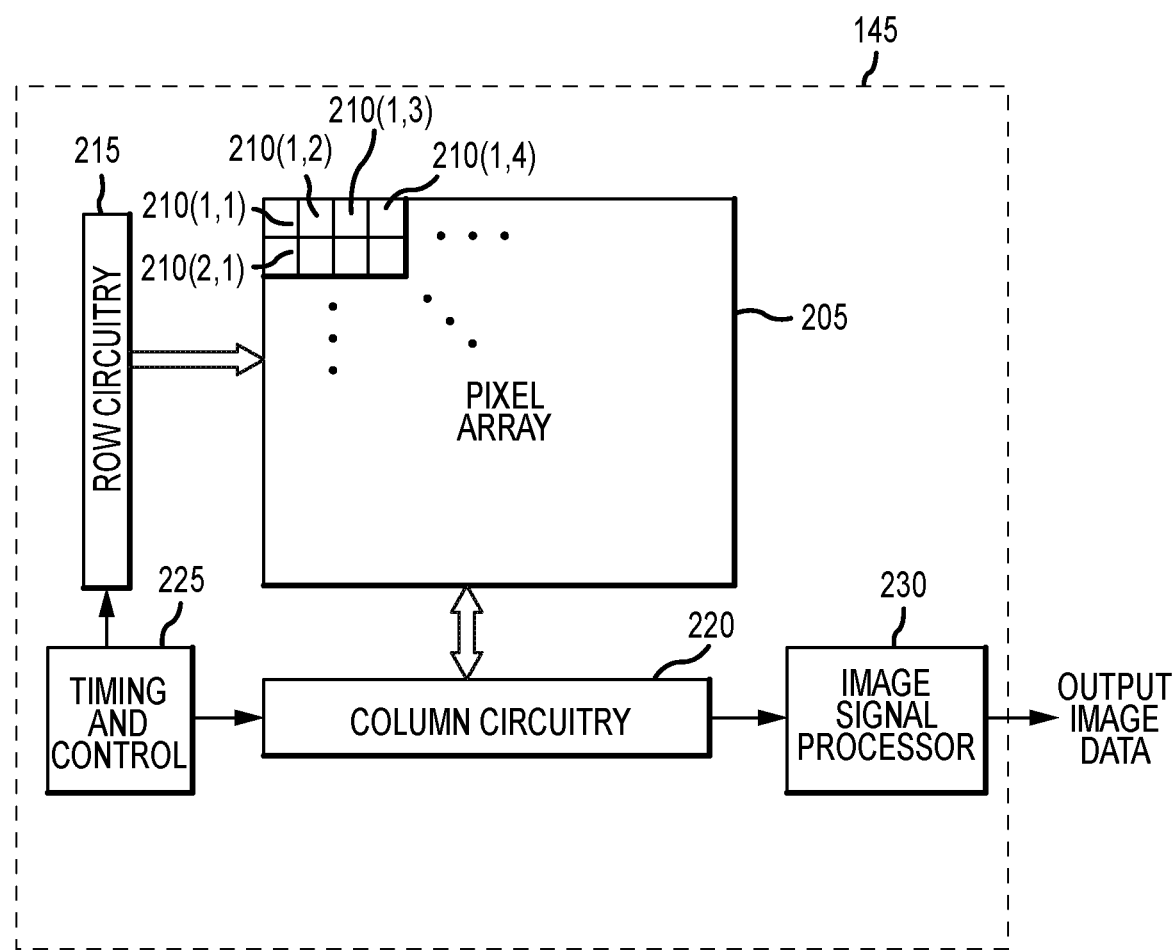
FIG. 2 is a block diagram of an imaging device in accordance with various embodiments of the present technology.

Referring to FIG. 2, the imaging device 145 captures image data by generating and collecting charge. For example, light may enter and strike a photosensitive surface of the imaging device 145 and generate charge. The imaging device 145 may further process the collected charge by converting the charge into electrical signals. In various embodiments, the imaging device 145 may be configured as an integrated circuit (i.e., a die) comprising various devices and/or systems to perform image capture and various readout functions. The imaging device 145 may be implemented in conjunction with any appropriate technology, such as active pixel sensors in complementary metal-oxide-semiconductors (CMOS) and charge-coupled devices (CCD). In an exemplary embodiment, the imaging device 145 may comprise a pixel array 205. The imaging device 145 may further comprise various circuits to perform sampling, amplification, and signal conversion, as well as processing circuitry, such as an image signal processor 230.

The pixel array 205 detects the light and conveys information that constitutes an image by converting the variable attenuation of waves (as they pass through or reflect off object) into electrical signals. The pixel array 205 may comprise a plurality of pixels 210 arranged to form rows and columns, and the pixel array 205 may contain any number of rows and columns, for example, hundreds or thousands of rows and columns. The pixel array 205 may be coupled to and configured to transmit pixel signals to the image signal processor 230.

Each pixel 210 may comprise a photosensitive region (not shown) for collecting charge, such as a photogate or photodiode, to detect light and convert the detected light into a charge, and various circuits and/or devices to convert the charge into a pixel signal and facilitate readout of the pixel signal. Each pixel signal may contain various information and/or image data, such as color information, light intensity, pixel location, and the like. The location (i.e., coordinate) of each pixel 210 may be defined by the particular location within the pixel array 205. Accordingly, each pixel 210 may be identified by a row number i and a column number j within the pixel array 205 (i.e., 210$(i,j)$). For example, the pixel 210 located at the first row and first column is referred to as the pixel 210(1,1).

In various embodiments, the pixel array 205 may further comprise various circuits to facilitate readout of the pixel signals. For example, the pixel array 205 may comprise row circuitry 215, column circuitry 220, and a timing and control circuit 225.

The row circuitry 215 may receive row addresses, which correspond to a particular location on the pixel array 205, from the timing and control circuit 225 and supply corresponding row control signals, such as reset, row select, charge transfer, and readout control signals to the pixels 210 via row control paths. The row circuitry 215 may comprise various wires, electrical connections, and/or devices integrated within the pixel array 205 and that couple to each pixel 210.

The column circuitry 220 may comprise column control circuitry, readout circuitry, signal conversion circuitry, and/or column decoder circuitry, and may receive pixel signals, such as analog pixel signals generated by the pixels 210. Column paths may be configured to couple each column of the pixel array 205 to the column circuitry 220. The column paths may be used for reading out pixel signals from the pixel 210 and/or supplying bias signal (e.g. bias current or bias voltages). The column circuitry 220 may further comprise various wires, electrical connections, and/or devices integrated within the pixel array 205 and that couple to each pixel 210.

In various embodiments, the timing and control circuit 225 may be communicatively coupled to the image signal processor 230 and/or the host processor 310 (FIG. 3) to receive readout operation instructions and/or facilitate the readout of the pixel signals. For example, the timing and control circuit 225 may be configured to adjust the timing of the pixel signal readout and other desired operations according to the instructions provided by the image signal processor 230 and/or the host processor 310. The timing and control circuit 225 may receive readout operation instructions from the image signal processor 230 and/or the host processor 310 (FIG. 3) according to the desired application and/or operation.

The timing and control circuit 225 may be configured to selectively activate and/or readout signals from the individual pixels 210 according to the readout instructions provided by the image signal processor 230 and/or the host processor 310. For example, the timing and control circuit 225 may be electrically coupled to the pixel array 205 and may transmit control signals, such as a pixel reset signal, a pixel readout signal, a charge transfer signal, and the like. The particular control signals produced and transmitted by the timing and control circuit 225 may be based on the pixel architecture, a desired image capture mode (e.g., global reset release mode, global shutter mode, and electronic rolling shutter mode), and a desired integration time. For example, the timing and control circuit 225 may be configured to capture multiple image frames, each with a different integration time. In various embodiments, the signals from each pixel 210 are read out sequentially, from a first row to a last row, wherein each row is read out from left to right.

In various embodiments, the imaging device 145 may further comprise a color filter system (not shown), such as a color filter array (CFA), to filter impinging light according to wavelength. The CFA may comprise a pattern of color filters situated on the pixel array 205 to capture color information. In various embodiments, each pixel 210 in the pixel array 205 is covered with one color of the CFA. For example, a Bayer color filter array comprising a pattern of red, blue, and green filters may be provided, wherein each pixel 210 is covered with one of a red, blue, or green filter. In other embodiments, the CFA may be formed using other color filters, such as a RCCG filter (one red, two clear, and one green), a RCCC filter (one red, and three clear), a CRGB filter (one cyan, one red, one green, and one blue), and any other suitable color pattern. In various embodiments, the CFA may comprise "clear" or transparent filter elements. The CFA may form a 2×2 color pattern, a 4×4 color pattern, a 2×4 color pattern, or any other suitable pattern size. In various embodiments, the CFA may repeat to cover the entire pixel array 205.

The image signal processor (ISP) 230 may perform various digital signal processing functions, such as color interpolation, color correction, facilitate auto-focus, exposure adjustment, noise reduction, white balance adjustment, compression and/or expansion, and the like, to produce output data. The ISP 230 may comprise any number of devices and/or systems for performing calculations, transmitting and receiving image pixel data, and the like. The ISP 230 may further comprise a storage unit (not shown), such as random-access memory, non-volatile memory or any other memory device suitable for the particular application, for storing pixel data. In various embodiments, the ISP 230 may be implemented with a programmable logic device, such as a field programmable gate array (FPGA) or any other device with reconfigurable digital circuits. In other embodiments, the ISP 230 may be implemented in hardware using non-programmable devices. In other embodiments, the ISP 230 may be implemented as a combination of software and hardware. The ISP 230 may be formed partially or entirely within an integrated circuit in silicon using any suitable complementary metal-oxide semiconductor (CMOS) techniques or fabrication processes, in an ASIC (application-specific integrated circuit), using a processor and memory system, or using another suitable implementation.

In an exemplary embodiment, the ISP 230 may receive the pixel signals and convert the signal into a pixel value. The ISP 230 may also store the pixel values according to the respective image frame from which each pixel signal corresponds. The ISP 230 may transmit the pixels values and information relating to their integration time to the host processor 310, wherein the host processor 310 may utilize the data from the pixel values to make operation decisions.

The ISP 230 may also be configured to transmit the output image data to a display system, such as a display screen or a memory component, for storing the image data and/or to allow a human to view the output image. The display system may receive digital image data, such as video data, image data, frame data, and/or gain information from the ISP 230. In various embodiments, the display system may comprise an external device, such as a computer display, memory card, or some other external unit.

In various embodiments, the system may comprise a compander. The compander may be configured to receive pixel data, represented by a binary number having N-bits, compress the pixel data to M-bits, where N>M, transmit the data, and expand the data. Various devices may be responsible for the compression function and expansion function. For example, the image signal processor 230 may be equipped with a compressor to compress the pixel data prior to transmitting the data to the host processor 310, and the host processor 310 may be equipped with an expander to receive and expand the compressed data. The compander operation may be realized using conventional companding algorithms, such as the µ-law algorithm.

In one embodiment, the ISP 230 may further comprise a register to store a preferred image frame index (e.g., 1, 2, 3, . . . N), where the preferred image frame index corresponds to one image frame from a plurality of image frames, such as the first, second, and third image frames 400, 500, 600. The ISP 230 may be further configured to compare the pixel signals from the image frame having the preferred image frame index with a first predetermined threshold and a second predetermined threshold.

According to various aspects of the present technology, the system may be configured to select and output a plurality of "best" pixel signals (i.e., pixel values) from multiple image frames. The best pixel signals may be those that have the most information (i.e., have the largest value) and are not saturated. The selected (best) pixel signals may then be compressed and sent with additional data indicating the image frame (and integration time) that each pixel signal came from. Information about the integration time may be utilized by the system, such as the camera system 105 and the ADAS 300, to enable the system to use the most representative pixel signal when making operation decisions. After the "best" pixel signals have been selected, the system may be configured to determine a level of confidence based on the image frame that the selected pixel signal came from. The system may also be configured to compare a preferred signal with predetermined parameters to increase the reliability of the information and output the preferred signal if it meets the predetermined requirements.

Referring to FIGS. 1-8, the system may capture multiple image frames, wherein each image frame is captured with different integration times TX (where X=1, 2, 3 . . . Y)). As such, each pixel in a given image frame will have the same integration time. For example, a first image frame 400 may have a first integration time T1 (e.g., T1=10 ms), while a second image frame 500 may be captured with a second integration time T2 (e.g., T2=5 ms), and a third image frame 600 may be captured with a third integration time T3 (e.g., T3=1 ms). According to various embodiments, the system may be configured to capture any number of image frames with any integration times. The length of time for each integration time may be predetermined and selected according to the particular application, desired outputs, and the like During image capture, each pixel 210 in the pixel array 205 generates a pixel signal $P_N(i,j)$ having a value (e.g., a magnitude), where N is the frame number (also referred to as an image frame index) and (i,j) represent the coordinate location on the pixel array 205. For example, the pixel 210 in the first row and first column is identified as pixel 210(1,1), and the pixel signal generated by that particular pixel for the first image frame 400 is identified as pixel signal $P_1(1,1)$. That same pixel 210(1,1) will also generate the pixel signal $P_2(1,1)$ for the second frame 500. The same is true for all pixels signals and all subsequent image frames.

In an exemplary operation, the imaging device 145 may generate the first image frame 400 with the first integration time T1 (800). The pixel signals $P_1(i,j)$ for each pixel 210 may be read out and transmitted to the image signal processor 230. The image signal processor 230 may determine, for each pixel signal $P_1(i,j)$ whether the pixel signal is saturated or non-saturated (805). A pixel signal may be saturated if the pixel value is greater than or equal to a first predetermined threshold. A pixel signal may be non-saturated if the pixel value is less than the first predetermined threshold. The image signal processor 230 may store the pixel values in a memory (not shown).

The imaging device 145 may then generate the second image frame 500 with the second integration time T2 (810). The pixel signals $P_2(i,j)$ for each pixel 210 may be read out and transmitted to the image signal processor 230. The image signal processor 230 may determine, for each pixel signal $P_2(i,j)$ whether the pixel signal is saturated or non-saturated (815). A pixel signal may be saturated if the pixel value is greater than or equal to a second predetermined threshold, and a pixel signal may be non-saturated if the pixel value is less than the second predetermined threshold. The image signal processor 230 may store the pixel values in a memory (not shown).

The imaging device 145 may then generate the third image frame 500 with the third integration time T3 (820). The pixel signals $P_3(i,j)$ for each pixel 210 may be read out and transmitted to the image signal processor 230. The image signal processor 230 may determine, for each pixel signal $P_3(i,j)$ whether the pixel signal is saturated or non-saturated (825). A pixel signal may be saturated if the pixel value is greater than or equal to a third predetermined threshold, and a pixel signal may be non-saturated if the pixel value is less than the third predetermined threshold. The image signal processor 230 may store the pixel values in a memory (not shown).

After the imaging device 145 generates the desired number of image frames with corresponding pixel signals, the image signal processor 230 may select the best signal from each pixel location (840) and construct an HDR output (e.g., an HDR image) using the best signals (845).

Selecting the best signal for each pixel location may comprise selecting the pixel signal that is non-saturated. Further, the best signal may comprise the pixel signal that has the greatest value. Further, the best signal may comprise the pixel signal that has the shortest integration time, as compared to all other integration times.

According to an exemplary embodiment, if only one pixel value for a particular pixel location is non-saturated, the ISP 230 may select the non-saturated pixel signal. Further, if more than one pixel value is non-saturated, the ISP 230 may select the pixel signal with the largest value. If two more pixel values are non-saturated and both have equally large values, then the ISP 230 may select the pixel signal with the shortest integration time.

For example, if the imaging device 145 generates the first image frame 400, the second image frame 500, and the third image frame 600, and assume that for pixel location 210(4,1), pixel signal $P_1(4,1)$ is non-saturated and has a value of 1000, pixel signal $P_2(4,1)$ is non-saturated and has a value of 700, and pixel signal $P_3(4,1)$ is non-saturated and has a value of 500, then the pixel signal selected as the best signal for the HDR output 700 for location (4,1) is pixel signal $P_1$. Assume that, for pixel location 210(4,2), pixel signal $P_1(4,2)$ is saturated, pixel signal $P_2(4,2)$ is non-saturated and has a value of 500, and pixel signal $P_3(4,2)$ is non-saturated and has a value of 500, then the pixel signal selected as the best signal for the HDR output 700 at location (4,2) is pixel signal $P_3$. Assume that, for pixel location 210(4,6), pixel signal $P_1(4,6)$ is saturated, pixel signal $P_2(4,6)$ is saturated, and pixel signal $P_3(4,6)$ is saturated, then the pixel signal selected as the best signal for the HDR output 700 for location (4,6) is pixel signal $P_3$. Assume that, for pixel location 210(4,3), pixel signal $P_1(4,3)$ is saturated, pixel signal $P_2(4,3)$ is non-saturated and has a value of 600, and pixel signal $P_3(4,3)$ is non-saturated and has a value of 500, then the pixel signal selected as the best signal for the HDR output 700 at location (4,3) is pixel signal $P_2$. It should be noted that the values of the pixel signals described above are arbitrary and used as examples for the purpose of explanation only.

Similarly, and referring to FIG. 9, in a case where the imaging device 145 generates four image frames, the ISP 230 may be configured to perform an exemplary pseudo code for each location on the pixel array 205. In the present case, variables "p3_saturated value," "p2_saturated_value," and "p1_saturated value" are predetermined threshold values, and P1 is a pixel value from a first image frame with integration time T1, P2 is a pixel value from a second image frame with integration time T2, P3 is a pixel value from a third image frame with integration time T3, and P4 is a pixel value from a fourth image frame with integration time T4, where T1 is the longest integration time and T4 is the shortest integration time (i.e., T1>T2>T3>T4). Accordingly, the ISP 230 compares the pixels values P1, P2, and P3 to the predetermined thresholds p1_saturated value, p2_sat-urated_value, p3_saturated value, respectively, and if the pixel value is greater than or equal to the respective threshold, then the pixel value is set to zero. The ISP 230 then compares pixel value P4 to pixel values P1, P2, and P3. If the pixel value P4 is greater than or equal to each of P1, P2, and P3, then the ISP 230 outputs P4 as the best signal and sets variable "out_sel" to 3. If the pixel value P4 is not greater than pixels values P1, P2, and P3, then the ISP 230 determines if the pixel value P3 is greater than or equal to P2 and P1. If the pixel value P3 is greater than or equal to both pixel values P2 and P1, then the ISP 230 outputs pixel value P3 as the best signal and sets variable "out_sel" to 2. If the pixel value P3 is not greater than or equal to both pixel values P2 and P1, then the IPS 230 determines if pixel value P2 is greater than or equal to pixel value P1. If the pixel value P2 is greater than or equal to P1, then the IPS 230 outputs pixel value P2 as the best signal and sets variable "out_sel" to 1. If the pixel value P2 is not greater than or equal to pixel value P1, then the ISP 230 outputs pixel value P1 as the best signal and sets variable "out_sel" to 0. The above-described process is performed for each pixel location.

According to various embodiments, the system may comprise a compander to reduce bandwidth requirements of the system. For example, the imaging device 145, such as the ISP 230, may comprise the compressor to compress the best pixel value and add an integration time index corresponding the integration time. The integration time index may comprise at least a 1-bit binary value, and in an exemplary embodiment, the integration time index comprises a 2-bit binary value. For example, the pixel value may be represented as a 12-bit binary value which is compressed to a 10-bit value, and the 2-bit value corresponding to the integration time is added to the 10-bit value for a total of 12 bits. In an exemplary embodiment, within the total number of bits, the integration time index occupies the 2 highest-order bit positions in the binary number. The imaging device 145 may transmit the 12-bit value to the host processor 310, where the host processor 310 may comprise the expander to expand the 12-bit value and utilize the integration time index to make various decisions. Accordingly, the number of bits sent to the host processor 310 uses the same number of bits per pixel as conventional methods. The system may utilize any conventional companding methods and techniques to perform compression and expansion.

According to various embodiments, the image signal processor 230 and/or host processor 310 may further apply a linearization gain to each selected best signal, and use the linearized values to construct the HDR output. In general, the linearization gain is the ratio of the longest integration time to a shorter integration time, as compared to all other integration times. The particular linearization gain applied to any given signal may be based on the integration time and the selected output signal. For example, and referring to FIG. 10, the host processor 310 may utilize the variables "out_sel" (e.g., 0, 1, 2, 3) and "out" (e.g., P1, P2, P3, P4) as determined from the process illustrated in FIG. 9. If the variable "out_sel" is set to 0, then the host processor 310 outputs the "out" value; if the variable "out_sel" is set to 1, then the host processor 310 outputs the "out" value multiplied by T1/T2; if the variable "out_sel" is set to 2, then the host processor 310 outputs the "out" value multiplied by T1/T3; if the variable "out_sel" is set to 3, then the host processor 310 outputs the "out" value multiplied by T1/T4. Accordingly, if the variable "out_sel" is set to 0, then the output is P1 and does not require linearization, so the HDR output value ("out_hdr") for that particular pixel location is set to the value of P1.

According to an exemplary embodiment, after the host processor 310 has applied the appropriate linearization gain to all pixel locations, the system may utilize the selected best signal information to perform a confidence assessment regarding the selected pixel values and/or corresponding color. For example, the confidence assessment may be HIGH if all of the selected pixel signals are coming from the same image frame (i.e., all color channels have the same integration time), and the confidence assessment may be LOW if all the selected pixel signals are coming from different image frames. The system may also utilize the output signal information to determine the optical flow.

According to various applications, the system may be equipped with the display screen to display the HDR output data for the purpose of human viewing, such as in the form of an HDR image. In such a case, the host processor 310 and/or image signal processor 230 may be configured to adjust the color of the HDR output data for more pleasant human viewing. For example, the host processor 310 and/or image signal processor 230 may perform various computations to enhance gray undertones of the HDR output data. In such a case, the host processor 310 and/or image signal processor 230 may operate under the assumption that the pixel signals from the image frame with the longest integration time are saturated. The host processor 310 and/or image signal processor 230 may determine the greater of the predetermined saturation value (e.g., p3_saturated_value, p2_saturated_value, and p1_saturated value) and the selected signal (e.g., "out" from FIG. 9) before applying the linearization gains. For example, the system may operate as described by the pseudo code in FIG. 11, where T1, T2, T3, and T4 are the integration times, where T1>T2>T3>T4. The particular integration ratio (e.g., T2/T1, T3/T2, T4/T3) may be based on the variable "out_sel" and/or the selected pixel value (e.g., P1, P2, P3, or P4).

According to an alternative embodiment, the host processor 310 may select the best signal for each pixel location according to the preferred image frame index. For example, the host processor 310 may be configured to output a signal (i.e., a preferred signal) from the preferred image frame index if the preferred signal meets a particular set of requirements. For example, the host processor 310 may compare the preferred signal to various thresholds and output a signal according to the comparison. The output signal (i.e., the best signal) may correspond to a lower or higher image frame index than the preferred image frame index. For example, the host processor 310 may output, for each pixel location, a pixel signal from a lower-index image frame if the pixel signal from the image frame having the preferred image frame index is less than a first predetermined threshold, and the host processor 310 may output a pixel signal from a higher-index image frame if the pixel signal from image frame having the preferred image frame index is greater than or equal to a second predetermined threshold. For example, in a case where the HDR output is constructed using four different image frames and assuming the preferred signal is a pixel signal from the second image frame (i.e., the preferred image frame index=2), then the image signal processor 230 and/or host processor 310 compares the pixel signal from the second image frame to a first predetermined threshold. As long as the pixel signal from the second image frame is less than the first predetermined threshold and the preferred image frame index is greater than 1, then the image signal processor 230 and/or host processor 310 will output the pixel signal from the first image frame and set the variable "out_sel" to 0. If the above requirements are not satisfied, then the image signal processor 230 and/or host processor 310 will determine if the pixel signal is greater than or equal to the second threshold and whether the preferred image frame is less than the total number of image frames. As long as the pixel signal is greater than or equal to the second threshold and that the preferred image frame is less than the total number of image frames, then the image signal processor 230 and/or host processor 310 will output the next higher index image frame, for example the pixel signal from the third image frame and the variable "out_sel" is set to 2. The preferred image frame index may be set according to a particular application. For example, the image signal processor 230 and/or host processor 310 may be configured to perform the operation described by the pseudo code in FIG. 12. In the present embodiment, the best signal is the signal output from the above-described selection method and the best signal from each pixel location is used to construct the HDR output. In addition, linearization gains, such as those described above, may be applied to the best signal according to the method described above.

In the ADAS 300, and referring to FIG. 3, the host processor 310 may utilize information from the imaging device 145, such as the HDR output, the confidence assessment, and the integration time index, to make decisions and control the peripheral systems 305 based on those decisions. For example, the host processor 310 may be configured to transmit various control signals to a relevant system within the peripheral systems 305.

In the foregoing description, the technology has been described with reference to specific exemplary embodiments. The particular implementations shown and described are illustrative of the technology and its best mode and are not intended to otherwise limit the scope of the present technology in any way. Indeed, for the sake of brevity, conventional manufacturing, connection, preparation, and other functional aspects of the method and system may not be described in detail. Furthermore, the connecting lines shown in the various figures are intended to represent exemplary functional relationships and/or steps between the various elements. Many alternative or additional functional relationships or physical connections may be present in a practical system.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. An imaging device, comprising:
a pixel array comprising a plurality of pixels, and configured to generate:
a first image frame comprising a plurality of first pixel signals with a first integration time; and
a second image frame comprising a plurality of second pixel signals with a second integration time; wherein the first integration time is different from the second integration time; and
an image signal processor connected to the pixel array and configured to:
determine a first value of a first pixel signal from the plurality of first pixel signals;
determine a second value of a second pixel signal from the plurality of second pixel signals; wherein the first pixel signal and the second pixel signal are generated from a same pixel from the plurality of pixels;
identify the first pixel signal as one of: saturated and non-saturated according to the first value;
identify the second pixel signal as one of: saturated and non-saturated according to the second value;
select a best signal among the first pixel signal and the second pixel signal; wherein the best signal is:
non-saturated if at least one pixel signal is non-saturated; and
saturated only if both the first and second pixel signals are saturated; and
construct a high dynamic range (HDR) output utilizing the best signal.

2. The imaging device of claim 1, wherein, if both the first pixel signal and the second pixel signal are non-saturated, then the best signal is the pixel signal with the greatest value.

3. The imaging device of claim 1, wherein, if both the first pixel signal and the second pixel signal are non-saturated and both have the same value, then the best signal is the pixel signal with the shortest integration time.

4. The imaging device of claim 1, wherein if both the first pixel signal and the second pixel signal are saturated, then the best pixel signal is the pixel signal with the shortest integration time.

5. The imaging device of claim 1, wherein the image signal processor is further configured to apply a first linearization gain to the plurality of first pixel signals and apply a second linearization gain to the plurality of second pixel signals.

6. The imaging device of claim 1, wherein the image signal processor is further configured to compand the best signal from an N-bit value to an M-bit value, where N is greater than M, prior to constructing the HDR output.

7. The imaging device of claim 1, wherein the image signal processor is further configured to assign at least a 1-bit code corresponding to the first integration time to the first pixel signal and assign at least a 1-bit code corresponding to the second integration time to the second pixel signal.

8. A method for generating a high dynamic range image, comprising:
generating a plurality of sequential image frames with a pixel array,
wherein:
the pixel array comprises a plurality of pixels; and
each pixel is defined by a pixel location; and
wherein:
each image frame comprises a plurality of pixel signals;
each image frame has a different integration time; and
each pixel signal corresponds to one pixel from the pixel array;
determining a value for each pixel signal from each image frame;
determining, for each pixel signal, if the pixel signal is one of: non-saturated and saturated;
for each pixel location, selecting a best signal among the plurality of image frames;
wherein the best signal is:
non-saturated if at least one pixel signal is non-saturated; and
saturated only if all of the pixel signals are saturated; and
constructing a high dynamic range (HDR) output utilizing the best pixel signal.

9. The method of claim 8, wherein, if all pixel signals for one pixel location are non-saturated, then select the pixel signal with the greatest value.

10. The method of claim 8, wherein, if all pixel signals for one pixel location are non-saturated and all pixel signals have the same value, then select the pixel signal with the shortest integration time.

11. The method of claim 8, wherein, if all of the pixel signals for one pixel location are saturated, then select the pixel signal with the shortest integration time.

12. The method of claim 8, further comprising applying a linearization gain to each pixel signal from each image frame, wherein the linearization gain is a ratio of a longest integration time to a shorter integration time.

13. A machine vision system, comprising:
an imaging device, comprising:
a pixel array comprising a plurality of pixels, wherein each pixel from the plurality of pixels is defined by a pixel location; and
wherein:
the pixel array is configured to generate a plurality of sequential image frames with each frame having a different integration time;
each image frame comprises a plurality of pixel signals; and
each pixel signal corresponds to one pixel from the pixel array;
an image signal processor connected to the pixel array and configured to:
determine a value for each pixel signal from each image frame;
determine, for each pixel signal, if the pixel signal is one of non-saturated and saturated according to the determined value;
for each pixel location, select a best pixel signal from the plurality of image frames;
wherein the best signal is:
non-saturated if at least one pixel signal is non-saturated; and
saturated only if all of the pixel signals are saturated; and
construct a high dynamic range (HDR) output utilizing the selected pixel signals; and
a host processor connected to the imaging device and configured to receive the HDR output and generate a decision according to the HDR output.

14. The machine vision system of claim 13, wherein, if all pixel signals for one pixel location are non-saturated, then the image signal processor selects the pixel signal with the greatest value.

15. The machine vision system of claim 13, wherein, if all pixel signals for one pixel location are non-saturated and all pixel signals have the same value, then the image signal processor selects the pixel signal with the shortest integration time.

16. The machine vision system of claim 13, wherein if all pixel signals for one location are saturated, then the image signal processor selects the pixel signal with the shortest integration time.

17. The machine vision system of claim 13, wherein:
the image signal processor is further configured to apply a linearization gain to each pixel signal from the plurality of image frames according to the integration time; and
the linearization gain is a ratio of a longest integration time to a shorter integration time.

18. The machine vision system of claim 13, wherein:
the image signal processor comprises a register to store a preferred image frame index, where the preferred image frame index corresponds to one image frame from the plurality of image frames; and
the image signal processor is further configured to compare the pixel signals from the image frame having the preferred image frame index with a first predetermined threshold and a second predetermined threshold.

19. The machine vision system of claim 18, wherein selecting one pixel signal from the plurality of image frames comprises selecting one of:
the pixel signal from a lower-index image frame if the pixel signal from the image frame having the preferred image frame index is less than the first predetermined threshold; and
the pixel signal from a higher-index image frame if the pixel signal from the image frame having the preferred image frame index is greater than or equal to the second predetermined threshold.

20. The machine vision system of claim 13, wherein the image signal processor further performs a confidence assessment of the HDR output according to the integration time; and wherein:
the confidence assessment is HIGH if all of the selected pixel signals are from the same image frame; and
the confidence assessment is LOW if all of the selected pixel signals are from different image frames.

* * * * *